United States Patent
Chang et al.

(10) Patent No.: US 7,412,499 B2
(45) Date of Patent: Aug. 12, 2008

(54) METHOD FOR ADDING NEW MEMBERS TO A GROUP BY SENDING A COMMIT MESSAGE WITH UPDATED MEMBERSHIP LIST TO ALL NODES ON THE UPDATED LIST

(75) Inventors: Chun-Shi Chang, Poughkeepsie, NY (US); Felipe Knop, Poughkeepsie, NY (US); Tseng-Hui Lin, Poughkeepsie, NY (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 738 days.

(21) Appl. No.: 11/049,397

(22) Filed: Feb. 2, 2005

(65) Prior Publication Data

US 2005/0128960 A1    Jun. 16, 2005

Related U.S. Application Data

(62) Division of application No. 09/850,809, filed on May 8, 2001, now Pat. No. 7,120,693.

(51) Int. Cl.
    *G06F 15/177* (2006.01)
(52) U.S. Cl. .................. 709/220; 709/223; 709/224; 709/249
(58) Field of Classification Search .......... 709/220, 709/223, 224, 249, 226, 238, 225, 205, 201; 375/346; 370/254
See application file for complete search history.

(56) References Cited

U.S. PATENT DOCUMENTS

| | | | |
|---|---|---|---|
| 4,853,843 A | 8/1989 | Ecklund | 364/200 |
| 5,065,399 A | 11/1991 | Hasegawa et al. | 371/11.2 |
| 5,805,578 A | 9/1998 | Stirpe et al. | 370/255 |
| 5,805,593 A | 9/1998 | Busche | 370/396 |
| 5,805,786 A | 9/1998 | Badovinatz et al. | 395/182 |
| 5,926,619 A | 7/1999 | Badovinatz et al. | 395/182.02 |
| 5,946,498 A | 8/1999 | Chiang et al. | 710/54 |
| 6,061,723 A | 5/2000 | Walker et al. | 709/224 |
| 6,138,049 A | 10/2000 | McLaughlin | 700/67 |
| 6,178,327 B1 | 1/2001 | Gomez | 455/445 |
| 6,195,760 B1 | 2/2001 | Chung et al. | 714/4 |
| 6,823,355 B1 * | 11/2004 | Novaes et al. | 709/201 |
| 6,839,752 B1 * | 1/2005 | Miller et al. | 709/224 |
| 6,885,644 B1 * | 4/2005 | Knop et al. | 370/254 |
| 6,917,985 B2 * | 7/2005 | Madruga et al. | 709/238 |
| 6,968,359 B1 * | 11/2005 | Miller et al. | 709/205 |
| 7,069,320 B1 * | 6/2006 | Chang et al. | 709/225 |
| 7,325,046 B1 * | 1/2008 | Novaes et al. | 709/220 |
| 2001/0034793 A1 * | 10/2001 | Madruga et al. | 709/238 |
| 2002/0049845 A1 * | 4/2002 | Sreenivasan et al. | 709/226 |
| 2003/0016770 A1 * | 1/2003 | Trans et al. | 375/346 |

\* cited by examiner

*Primary Examiner*—Le Luu
(74) *Attorney, Agent, or Firm*—Geraldine D. Monteleone, Esq.; Lawrence D. Cutter, Esq.; Heslin Rothenberg Farley & Mesiti P.C.

(57) ABSTRACT

The determination of node and/or adapter liveness in a distributed network data processing system is carried out via one messaging protocol that can be assisted by a second messaging protocol which is significantly less susceptible to delay, especially memory blocking delays encountered by daemons running on other nodes. The switching of protocols is accompanied by controlled grace periods for needed responses. This messaging protocol flexibility is also adapted for use as a mechanism for controlling the deliberate activities of node addition (birth) and node deletion (death).

8 Claims, 10 Drawing Sheets

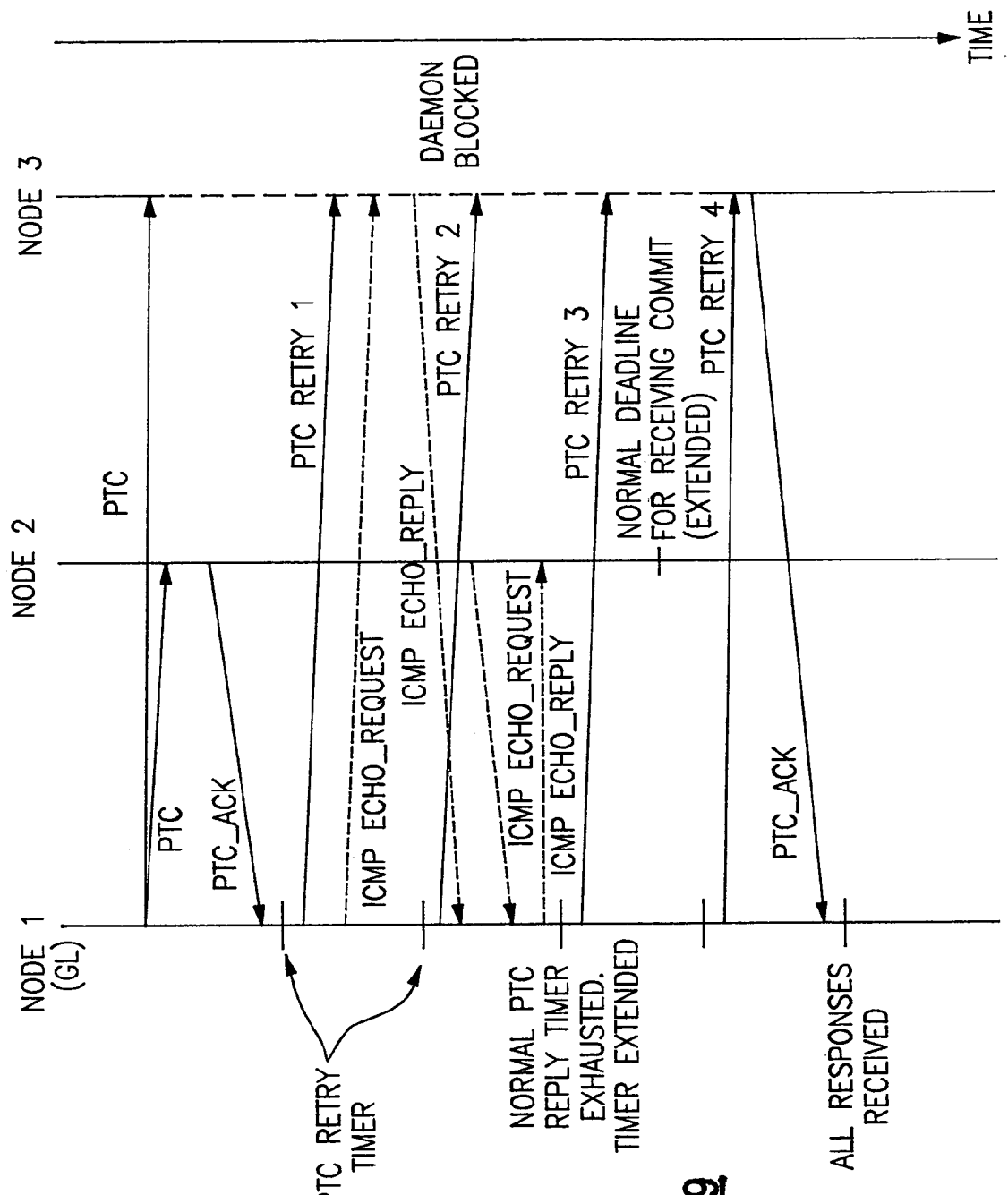

METHOD FOR ADDING NEW MEMBERS TO A GROUP BY SENDING A COMMIT MESSAGE WITH UPDATED MEMBERSHIP LIST TO ALL NODES ON THE UPDATED LIST

This application is a divisional of U.S. patent application Ser. No. 09/850,809 filed on May 8, 2001 now U.S. Pat. No. 7,120,693.

The present invention is directed to a method for determination of adapter and node death in a distributed data processing system that is capable of using messaging protocols which operate at different levels, with different priorities and/or with different characteristic response limitations. A significant advantage of the present invention is a superior resilience to false failure notifications caused by daemon blockage.

BACKGROUND OF THE INVENTION

The determination of adapter and node liveness lies at the heart of any highly available distributed data processing network in which the nodes are dividable into clusters which are typically employed to operate on dedicated applications. In order to provide high availability services, a cluster system should be able to determine which nodes, networks, and network adapters in the system are working. The failure in any such component should be detected early and the resultant information passed on to a higher level software subsystem and, if possible, recovery operations should be initiated by a cluster recovery manager and application level software.

Determination of node, network, and network adapter liveness is often made through the use of daemon processes running in each node of the distributed system. Daemons run distributed protocols and exchange liveness messages that are forced through the different network paths in the system. If no such liveness messages are received within a predetermined interval then the sending node or network adapter is assumed not to be working ("dead") by the others.

This method of liveness determination imposes real-time constraints for the corresponding daemons: if a daemon gets delayed for any reason this may result in the hosting node being falsely detected as dead—a "false down" event. False down events result in unnecessary, and often costly, recovery procedures which can disrupt the operations of the cluster.

Making daemons obey these real time constraints is often far from trivial, however, since the underlying operating system is seldom real-time. Only real-time operating systems can guarantee finite response times under any circumstances.

If the load on one of the nodes of the system is such that the physical memory needs greatly exceed the amount of memory present, heavy paging starts to occur, which occasionally leads to processes making little progress. In terms of the liveness determination daemon, these paging operations can operate to prevent it from sending liveness messages in a timely fashion.

Although some operating systems do provide primitives that allow processes to keep their pages from being "stolen" by other applications, in practice this solution is not perfect: either the primitives do not work on the entire addressing space (for example, they may not work with shared libraries) or the operating system itself is often pageable.

Besides memory starvation, other causes are known to prevent processes from making adequate progress: high interrupt rate, which blocks any process in the system from running, and the presence of high-priority processes that monopolize CPU utilization.

Different approaches could be used in order to prevent these "false down" events caused by process blockage:
1) Increasing the threshold of the number of missing incoming liveness messages before the remote entity is declared "down";
2) Making the daemon as real time as possible, employing real-time scheduling priority and operating system primitives to prevent paging; and
3) Incorporating the code responsible for sending the liveness messages into the kernel.

The first method has the drawback that real failures take longer to be detected, which for (real) failures may result in longer periods during which the end-user service offered by the cluster is unavailable.

The second method is only partially effective. Not only does it require the use of multiple real-time primitives offered by the operating system, but also careful design to avoid known causes of blocking, such as communication and I/O. Still the operating system may be unable to guarantee that the process will always make progress.

The third method may produce good results, but at a sometimes prohibitive development cost, since code needs to be introduced into the operating system kernel, which severely impairs portability and serviceability. A subtle problem with this approach is that it can only provide "kernel liveness," being ill-suited to detect situations where the kernel is able to run but not user programs. Under such situations, the node becomes useless and declaring it dead is likely to be the correct decision.

SUMMARY OF THE INVENTION

The present invention provides a mechanism which prevents data processing nodes from being prematurely and/or erroneously declared as being "dead" in a connected network of such nodes. More specifically, in accordance with a preferred embodiment of the present invention, there is provided a method for determining the status of nodes and/or node adapters in a network of connected data processing nodes. The nodes exist as a group, and there is preferably provided a group leader with special functions and authorities. (However, it is noted that the existence of a Group Leader is not essential for the operation of the present invention in its broadest scope.) Periodically, each node in the group sends a status message to a defined node in the group. This is referred to as a heart beat or heart beat message or more informally as an "I am alive" message. If the nodes are connected in a ring topology, which is the preferred implementation herein, then each node sends its heart beat message to its downstream neighbor in the ring. The transmitted message is directed to a daemon program running on the designated node (or nodes for non-ring topologies) for the purpose of providing responses to the "I am Alive" (heart beat) messages. The daemon does not respond by passing along the heart beat message to a predefined node or nodes, but rather, periodically sends its own heart beat message to a designated recipient (or to designated recipients in the event that a non-ring topology of node interconnection is employed). However, passing heart beat messages does provide an alternate, though unpreferred, method of providing this service. Each node periodically determines whether or not a heart beat signal has been sent from a designated sending node. If a certain number of heart beat signals are not received as expected, it is possible that the daemon responsible for its transmission has been delayed due to memory constraint problems at the sending node. Delay in the response of this daemon can arise from a number of causes which can also include the situation in which other applications running on the node are assigned higher priorities of execution by the local operating system; this delay phenomenon is not solely limited to memory constraint problems. To assure that the present mechanism is "ahead of the game," a second message is sent preferably before it is absolutely essential, that is, before other approaches, as described above, would have already declared the node "dead." This second message is sent to the nonresponding node. However, the second message is not sent to the daemon, but rather, to programming running on the message receiving nodes which does not possess the same memory constraint problems. In particular, the second message is preferably directed to an operating system kernel portion for which priority processing is available. Even more particularly, preferred embodiments of the present invention employ the "ping" function as employed in Unix-based operating systems.

In accordance with another embodiment of the present invention, the process of adding nodes to a group or the process of handling a node "death" are also endowed with this two-level messaging mechanism. This assures that modification of the structure or topology of the group can be changed in an efficient manner without the imposition of delays in message communication, particularly those caused by local memory constraint problems. In particular, the present invention also employs a "Prepare To Commit" (PTC) message which is processed in a similar manner as the above-described "I am Alive." (IAA) message. While the use of the concepts employed in the present invention can have the effect of cutting down on some delays that can occur, the primary advantage is that its use prevents nodes from prematurely being declared as "dead."

Accordingly, it is an object of the present invention to provide a system and method for determining the state of node "liveness" in a distributed data processing network.

It is also an object of the present invention to avoid the problem of blocked daemons used in message processing requests which relate to node status, particularly the status that reflects whether or not a node is alive and functioning.

It is yet another object of the present invention to be able to eliminate delays in system processing and overhead caused by the situation in which nodes are prematurely declared as being "dead."

It is a still further object of the present invention to process addition of nodes to a network group and to also process removal of nodes from a network group without unnecessary delay.

It is also an object of the present invention to eliminate message response delays engendered by memory constraint problems in remote nodes.

It is yet another object of the present invention to insure full network system utilization and to avoid states in which full process participation by all of the desired nodes is lacking.

It is a still further object of the present invention to provide a mechanism for detecting deaths of nodes and/or node adapters and for providing a graceful reorganization of group membership.

Lastly, but not limited hereto, it is an object of the present invention to take advantage of operating system kernel functions which are not encumbered by memory paging, memory allocation, or similar delay-causing constraints.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 9 is an event timeline illustrating the transmission of "prepare to commit" and corresponding acknowledgment messages.

DETAILED DESCRIPTION OF THE INVENTION

Figure 1:
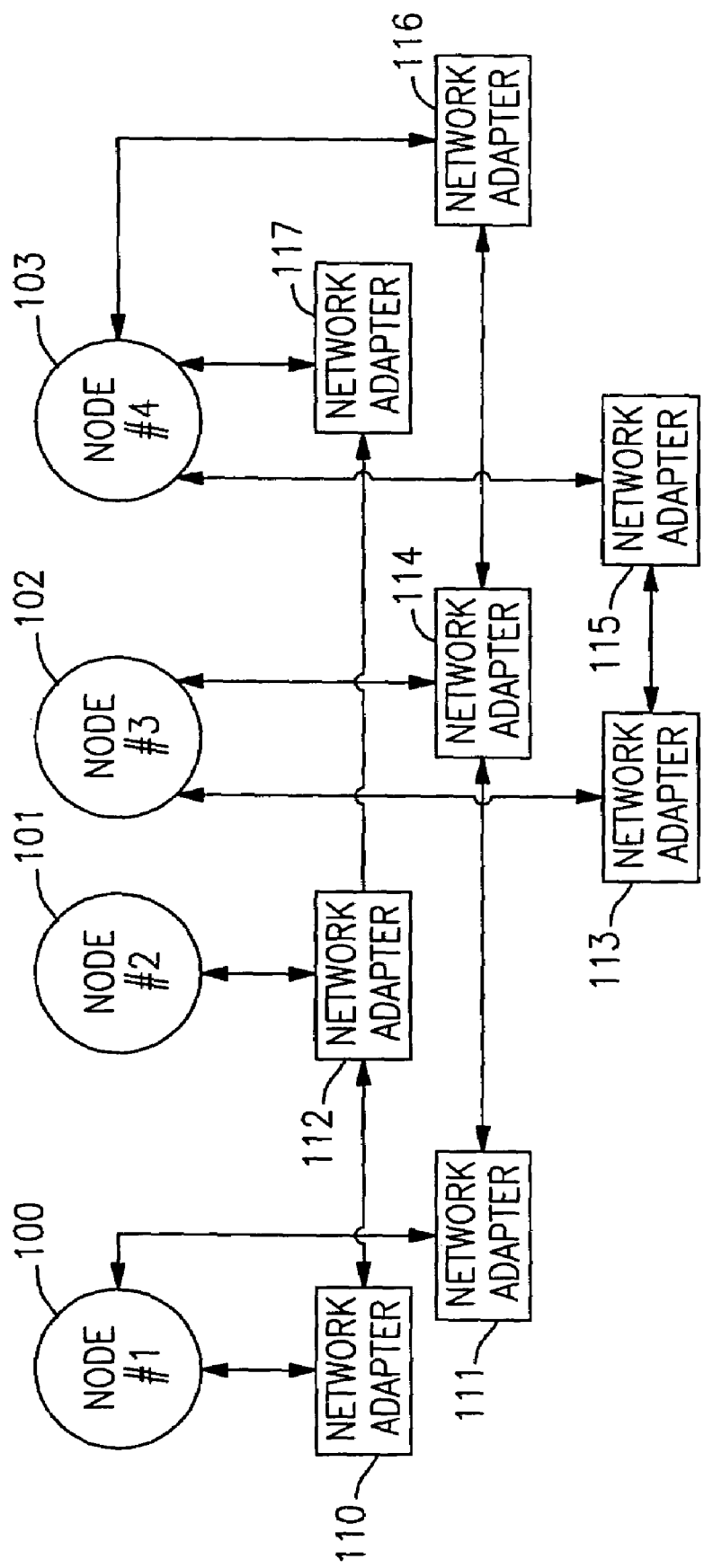
FIG. 1 is a block diagram illustrating the environment in which the present invention is employed, namely, within an interconnected network of data processing nodes.

The present mechanism is provided to prevent "false downs" that result from daemon blockage under stress loads and under other conditions that cause processes to be blocked. The mechanism uses Internet Control Message Protocol (ICMP) echo request messages, which are sent to the node/adapter which is suspected of being down. Since such messages are responded to by the kernel in interrupt mode, they are responded to even if the peer daemon is temporarily blocked. If an ICMP echo-reply response is received from the "suspected-dead" node or adapter, then a grace period is established for it, and the node or adapter is not declared dead, at least initially.

The present mechanism offers advantages over the three approaches itemized in the list given above. Unlike the first alternate approach suggested above, the detection time for real adapter and/or node failures is not increased. The present mechanism is also more effective than the second alternate approach given above, since the operating system kernel is more likely to be able to respond quickly to an ICMP echo request message than allowing a user-level process to run. Finally, the present mechanism does not require writing kernel code as would the third alternate approach from above.

The mechanism proposed herein is introduced in the context of its use in the Topology Services subsystem, which is part of IBM's Reliable Scalable Cluster Technology (RSCT) infrastructure. Topology Services provides the "liveness layer" of the system since it is responsible for determining the set of working nodes, networks, and network adapters in the cluster.

Heart Beat Protocols

To better explain the mechanism, and how it is employed in Topology Services, the adapter membership ("heartbeating") protocols in the subsystem are now described in more detail.

In order to monitor the health and connectivity of adapters in each network, all adapters in the network attempt to form an "Adapter Membership Group" (AMG), which is a group which contains all network adapters that can communicate with each other in the network. Adapters in an AMG monitor the "liveness" of each other. When an AMG is formed, all group members receive an "AMG id" which uniquely identifies the AMG. Adapters that fail are expelled from the group, and new adapters that are powered up are invited to join the group. In both cases, a new AMG with a new AMG is formed. Each AMG has one member that is the Group Leader (GL), and all members know which node is the Group Leader. Note that a node may belong to several AMGs, one for each of its network adapters.

To determine the set of adapters that are alive in each network, an adapter membership protocol is run in each of the networks. Messages in this protocol are sent using UDP/IP (User Datagram Protocol/Internet Protocol). While this protocol is referred to as an Internet Protocol, it should be noted that the use of this term herein does not imply the existence of any Internet connections nor does it imply dependence on the Internet in any way. It is simply the name of a conveniently used, well-characterized communication protocol usable within a connected network of data processing nodes.

Adapters that are alive form an AMG, where members are preferably organized in a virtual ring topology. To ensure that all group members are alive, each member periodically sends "heart beat" messages to its "downstream neighbor" and monitors "heart beat" messages from its "upstream neighbor." "Heart beat" messages are also referred to herein as "I am Alive." (AYA) messages. Death Protocols and Join Protocols, respectively, are run when adapters fail or when new adapters become functional. The goal of such protocols is to guarantee that the membership group contains at each moment all (and only) the adapters in the network (but only those belonging to the cluster) that can communicate with each other.

Besides the Group Leader, each group has a "Crown Prince" (backup group leader). See U.S. Pat. Nos. 5,805,786 and 5,926,619 for a description of the "Crown Prince" model. The group leader is responsible for coordinating the group protocols, and the crown prince is responsible for taking over the group leadership if the group leader adapter fails. Both the choice of group leader and crown prince, and the position of the adapters in the ring, are determined by a predefined adapter priority rule, which herein is preferably chosen to be the adapters' IP address. This address provides a conveniently available and unique identifier all of whose characteristics make it highly suitable for this role.

A list of all possible adapters in each network is contained in a configuration file that is read by all of the nodes at startup and at reconfiguration time.

Join Protocol

In order to attract new members to the group, the Group Leader in each group periodically sends "PROCLAIM" messages to adapters that are in the adapter configuration but do not currently belong to the group. The message is only sent to adapters having a lower IP address than that of the sender. It is noted that, while the use of IP addresses is the preferred mechanism for properly directing "PROCLAIM" messages, any other convenient method is also applicable; the only requirement is transmission to a well-defined set of nodes having a Group Leader.

The "PROCLAIM" messages are ignored by all adapters that are not group leaders. A group leader node receiving a "PROCLAIM" message from a higher priority (higher IP address) node responds with a "JOIN" message on behalf of its group. The message contains the membership list of the "joining group."

A node, say GL1, upon receiving a "JOIN" message from another node, say GL2, attempts to form a new group containing the previous members plus all members in the joining group. Node GL1 then sends a "Prepare To Commit" (PTC) message to all members of the new group, including node GL2.

Nodes receiving a "Prepare To Commit" message reply with a "PTC_ACK" (Prepare To Commit Acknowledgment) message. All of the nodes from which a "PTC_ACK" message was received are included in the new group. The group leader (node GL1) sends a "COMMIT" message, which contains the entire group membership list, to members of the newly formed group.

Receiving a "COMMIT" message marks the transition to the new group, which now contains the old members plus the joining members. After receiving this message, a group member starts sending "heart beat" messages to its (possibly new) downstream neighbor and starts monitoring "heart beat" messages from its (possibly new) upstream neighbor.

Both "Prepare To Commit" and "COMMIT" messages require an acknowledgment to ensure they were received. If no acknowledgment is received, then a finite number of retries is made. Failure to respond to a "Prepare To Commit" message, after all retries have been exhausted, results in the corresponding adapter not being included in the new group. If a daemon fails to receive a "COMMIT" message after all retries of the "PTC_ACK" message, then the local adapter gives up the formation of the new group and reinitializes itself into a singleton group. This phenomenon should only occur in the relatively rare case where the Group Leader fails in the short window between sending the "Prepare To Commit" and "COMMIT" messages.

When the Topology Services daemon is initialized, it forms a singleton adapter group (of which the node is the group leader) in each of its adapters. The node then starts sending and receiving "PROCLAIM" messages.

Death Protocol

A node or adapter monitors "heart beat" messages coming from its "upstream neighbor" (the adapter in the group that has the next highest IP address among the group members). When no "heart beat" messages are received for a predefined period of time, the "upstream neighbor" is assumed to have failed. A "DEATH" message is then sent to the Group Leader, requesting that a new group be formed.

Upon receiving a "DEATH" message, the group leader attempts to form a new group containing all adapters in the current group except the adapter that was detected as failed. The Group Leader sends a "Prepare To Commit" message to all members of the new group. The protocol then follows the same sequence as that described above for the Join protocol.

After sending a "DEATH" message, the daemon expects to shortly receive a "Prepare To Commit" message. A number of retries is attempted, but if no "Prepare To Commit" message is received, then the interpretation is that the Group Leader adapter (or its hosting node) is dead and that the "Crown Prince" adapter is also dead and, therefore, was unable to take over the group leadership. In this case, the adapter reinitializes itself into a singleton group and also sends a "DISSOLVE" message, inviting all group members to do the same. This is the mechanism that allows all members of the group to find out about the simultaneous demise of the Group Leader and the Crown Prince members.

Basic Mechanisms

Once the AMG is formed, "heart beat" messages are preferably sent in a ring-like topology, with "downstream neighbors" monitoring periodic "heart beat" messages sent by the "upstream neighbor." One or more of the claims herein also refer to the "heart beat" message as a "first message." The downstream neighbor periodically checks to see whether a "heart beat" message was recently received from its upstream neighbor. If no message was received since the last check, then a "Missed Heartbeat" counter is incremented. If the Missed Heartbeat counter reaches a predetermined threshold value S (the "sensitivity"), then less sophisticated protocols would consider the remote adapter dead and report its demise.

It is also possible, while keeping within the scope and spirit of the present invention, to employ topologies that are not in the form of a ring. Any convenient topology may be employed. However, the ring topology is preferred since it is simple to implement and since it evinces greater scalability when the number of nodes is increased. Other topologies require that a description of the structural links is also communicated to the members of a group or prospective group member along with the communication of the member list, as described elsewhere herein. While this is generally an undesirable complication, it is, nonetheless, still possible without deviating from the broad principles upon which the present invention is based.

However, the protocol herein is changed so that when the counter reaches a value X (smaller than S), then an ICMP (Internet Control Message Protocol) echo request packet is sent to the adapter being monitored. If the remote node and adapter are alive, then the destination OS kernel, and most preferably its interrupt handler, replies with an ICMP "echo-reply" message, even if the peer daemon is blocked. The procedure is repeated when the counter reaches X+1, etc. If an ICMP "echo-reply" message is received from the monitored adapter, then this is interpreted as "the adapter being monitored is probably functioning, but that the corresponding daemon may be either blocked or dead." Since there is no immediate way of knowing what is happening to the other side, a grace period is established. The missed heartbeat counter is allowed to go past S until a value S1, which is significantly larger than S, is reached. At that time, if no "heart beat" message is received from the monitored adapter, then the adapter is finally declared dead.

If a "heart beat" message is again received at some point in the count between X and S1, then the grace period is deactivated, and the counter is reset to zero. The goal of the grace period is to account for the remote daemon being blocked due to memory starvation or some other factor. If the remote adapter or node is indeed dead, then no ICMP "echo-reply" packet should be received, and, therefore, no grace period is established. Consequently, there should not be a concern that a valid "adapter dead event" is delayed by the grace period. The only occasion where such delay occurs is when the corresponding daemon dies or gets indefinitely blocked, which should be a comparatively less common problem than a daemon being temporarily blocked by an excessive load problem.

The value of S1 is chosen to account for the "maximum reasonable time" that the daemon may be blocked in a system under large load.

On different "flavors" of Unix systems, sending and receiving ICMP messages requires a program to open a "raw socket." The raw socket's behavior is such that all of the ICMP packets received by the local adapter are given to each program that opens a raw socket. This may result in significant CPU resources being spent to process these packets, many of which could be unrelated to the "echo" message sent. To alleviate this problem, the "raw socket" is only kept open while it is being decided whether to apply the grace period. If no incoming "heart beats" are being missed or if a grace period is already in place, then the raw socket is closed.

Grace Period for Prepare to Commit (PTC) Message

Like the basic heartbeating mechanism, the re-forming of a group also has real-time constraints: if a node fails to respond to "Prepare To Commit" packets in a timely fashion, that is, until the Group Leader has given up waiting for "Prepare To Commit_ACK" messages, then the corresponding adapter may be declared dead by the Group Leader. Therefore, a mechanism is desired for the case in which the daemon gets blocked while sending or responding to "Prepare To Commit" messages.

A similar "ping & grace period" mechanism is introduced to account for a node whose daemon gets blocked while responding to a "Prepare To Commit" message. If the Group Leader does not get any response from an adapter even after all retries, then the Group Leader sends an ICMP (Internet Control Message Protocol) echo request message to the adapter. If an "echo-reply" message is received, then the Group Leader infers that the remote daemon may be blocked and establishes a grace period for it. However, this mechanism alone presents a problem: all of the other adapters (which do not know about the grace period) could "time-out" while waiting for the "COMMIT" message and then give up on the new group. To counteract this problem, the other adapters also apply the "ping & grace period" mechanism on the Group Leader. As long as the Group Leader node responds to the ICMP echo request messages and the grace period has not expired, the other adapters remain waiting for the "COMMIT" message. Note that the grace period implemented by non-Group Leader nodes also handles the situation where the daemon at the Group Leader node becomes blocked itself.

The amount of grace period applied by the non-Group Leader nodes takes into account the "Prepare To Commit" retries, where different nodes may get their "Prepare To Commit" messages in different retries.

The same method described above is also used for a daemon that sends a "DEATH" message. An ICMP echo request message is sent to the Group Leader in the case that a "Prepare To Commit" message takes too long to arrive (probably because the daemon at the Group Leader node is blocked).

What the mechanisms above achieve, without creating new protocol messages, is the ability to include an adapter in a new AMG even if the corresponding daemon gets blocked while running the protocol.

Attention is now directed to the figures which provide a complementary description of the structure, environment, and operation of the present invention. In particular, FIG. 1 is useful for appreciating the environment in which the invention is used. The environment comprises a plurality of data processing nodes (100, 101, 102, 103) interconnected (typically through multiple paths, as shown) to one another by means of network adapters (110 through 117). The exemplary nodes in which the invention is employed is the IBM p-Series of server products, formerly referred to as the RS/6000 SP (for Scalable Parallel). Each node typically includes at least one central processing unit, shared memory, local memory cache, and connections to an included non-volatile storage device, typically a hard disk DASD unit. An exemplary operating system for each node is the AIX Operating System, as supplied by the assignee of the present invention. Each node is capable of running with its own operating system which may or may not be AIX. AIX is a UNIX-like system and supports echo requests based on commands such as "ping" which are directed at the kernel (or core) of the operating system and which operates at a basically low level to provide fundamental "are you there" kinds of services. Clearly, communication problems can result when there is a node failure or even a failure of one of the network adapters.

Figure 2A:
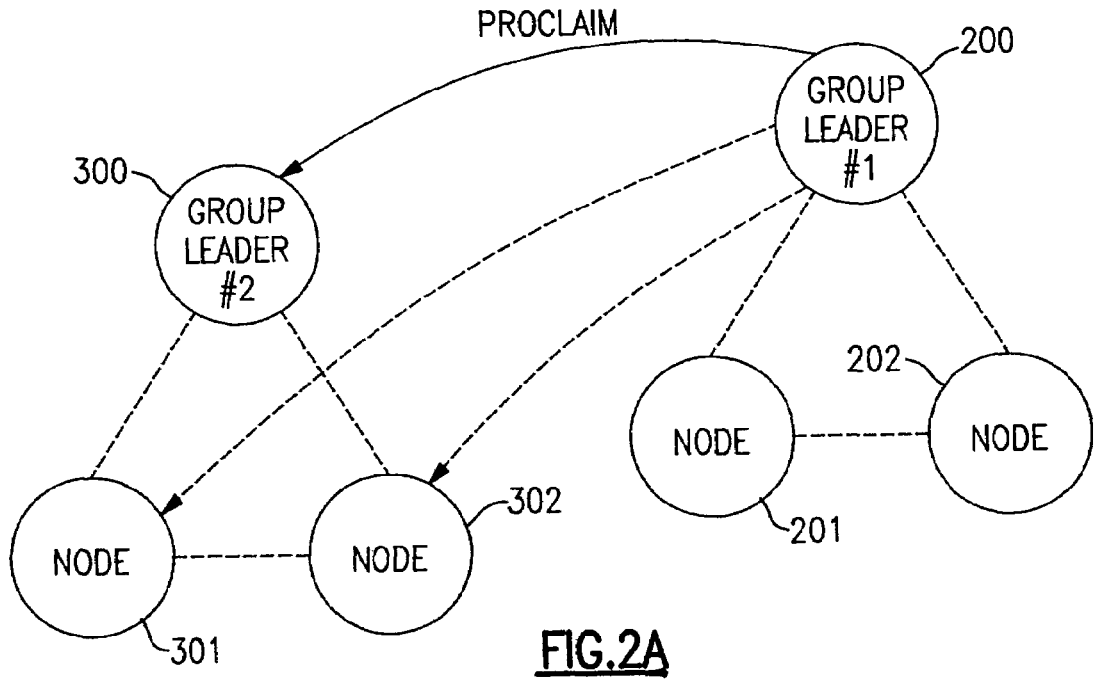
FIG. 2A is a signal flow graph illustrating the range of nodes employed in the transmission of a "proclaim" message.
Figure 2B:
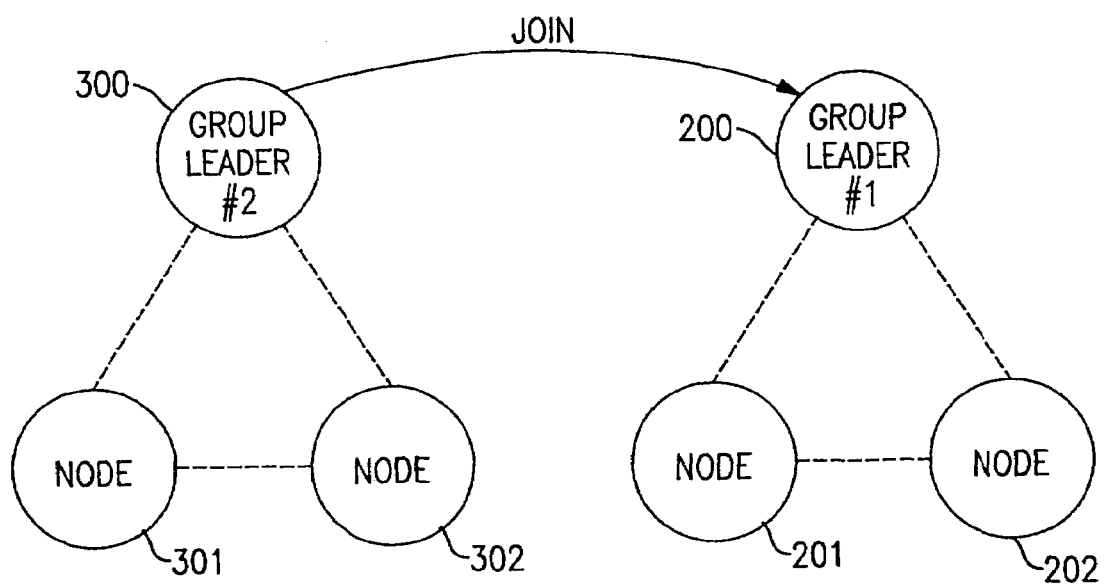
FIG. 2B is a signal flow graph similar to FIG. 2A, but more particularly illustrating the nodes involved in a "join" response to a "proclaim" message.
Figure 2C:
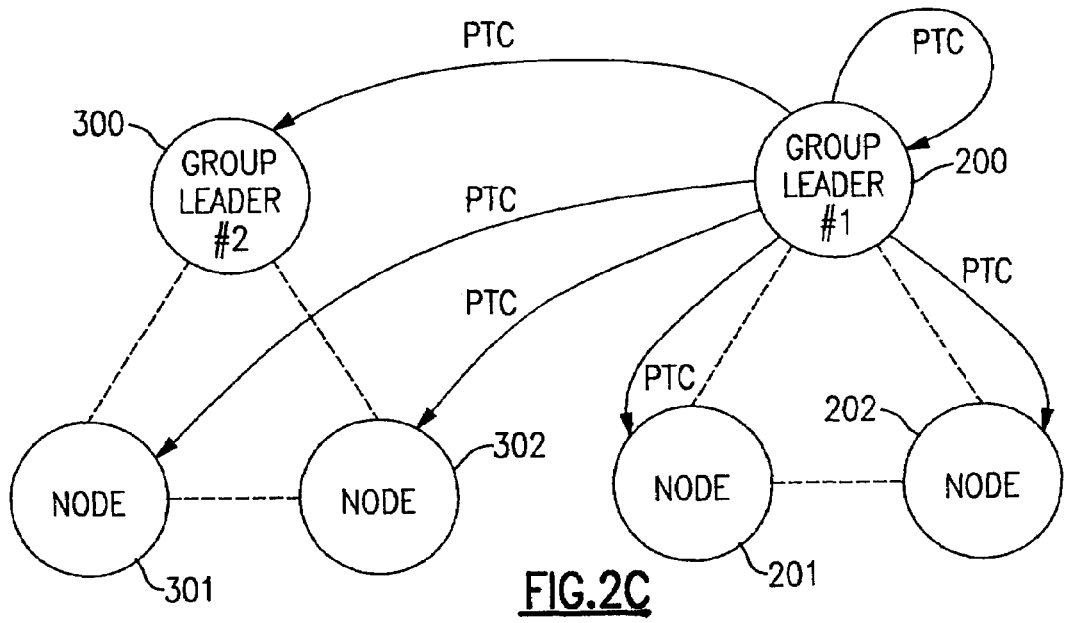
FIG. 2C is a signal flow graph similar to FIGS. 2A and 2B, but more particularly illustrating the transmission of "prepare to commit" (PTC) messages for the protocol involved in joining new nodes to a group.
Figure 2D:
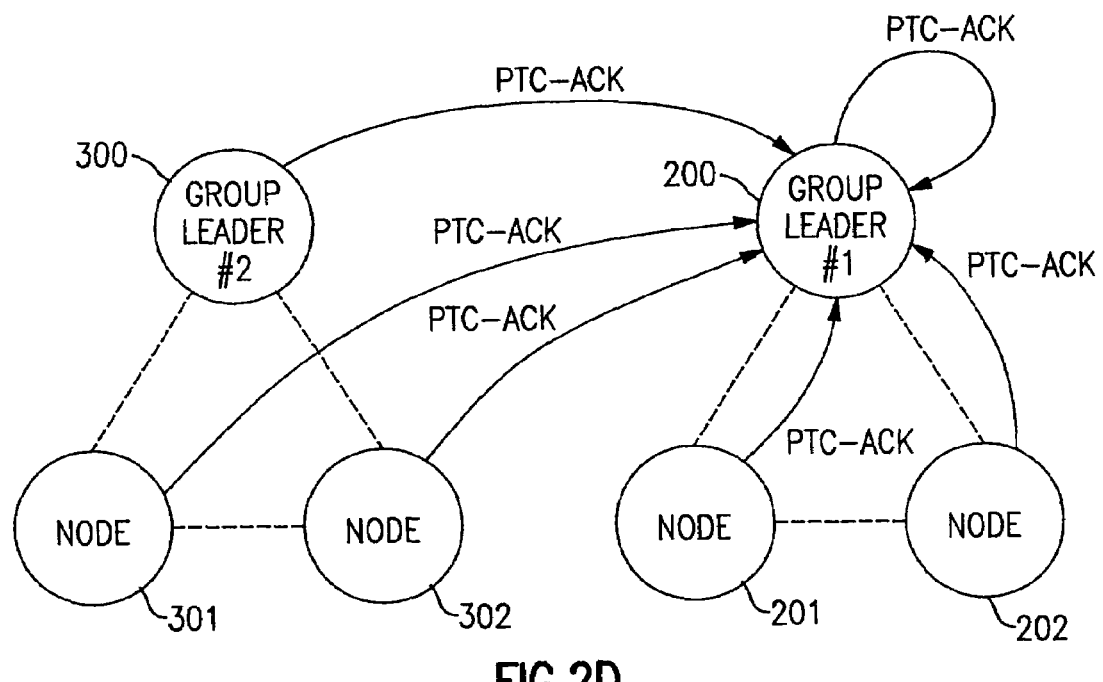
FIG. 2D is a signal flow graph similar to FIG. 2C, but more particularly illustrating the acknowledgment (PTC_ACK) of the "prepare to commit" message transmission.

The discussion above refers to the transmission of a periodically issued "proclaim" message. FIG. 2A illustrates the case where there are two node groups (nodes 200, 201 and 202 being one group; nodes 300, 301 and 302 being the other group). Nodes 200 and 300 are the Group Leaders of their respective groups. A "proclaim" message is sent from Group Leader #1 (node 200) in the rightmost group shown. This message need not be sent to nodes within its own current group. It is transmitted to all known nodes in the network, but such messages are only responded to by Group Leaders, hence the use of solid and dashed lines showing transmission of the "proclaim" message in FIG. 2A. Only Group Leaders respond to the "proclaim" message. The response, when a Group Leader wants to join an existing group, is the transmission of a "join" message to the sending Group Leader. See FIG. 2B. The protocol for joining a group also includes the transmission of a "prepare to commit" message to all of the nodes involved, as shown in FIG. 2C. The normal response to the PTC signal is the tranmission of a message which acknowledges receipt of the PTC message, that is, the transmission of the PTC_ACK signal from the same nodes as shown in FIG. 2C. The transmission of this latter signal is shown more particularly in FIG. 2D.

Figure 3A:
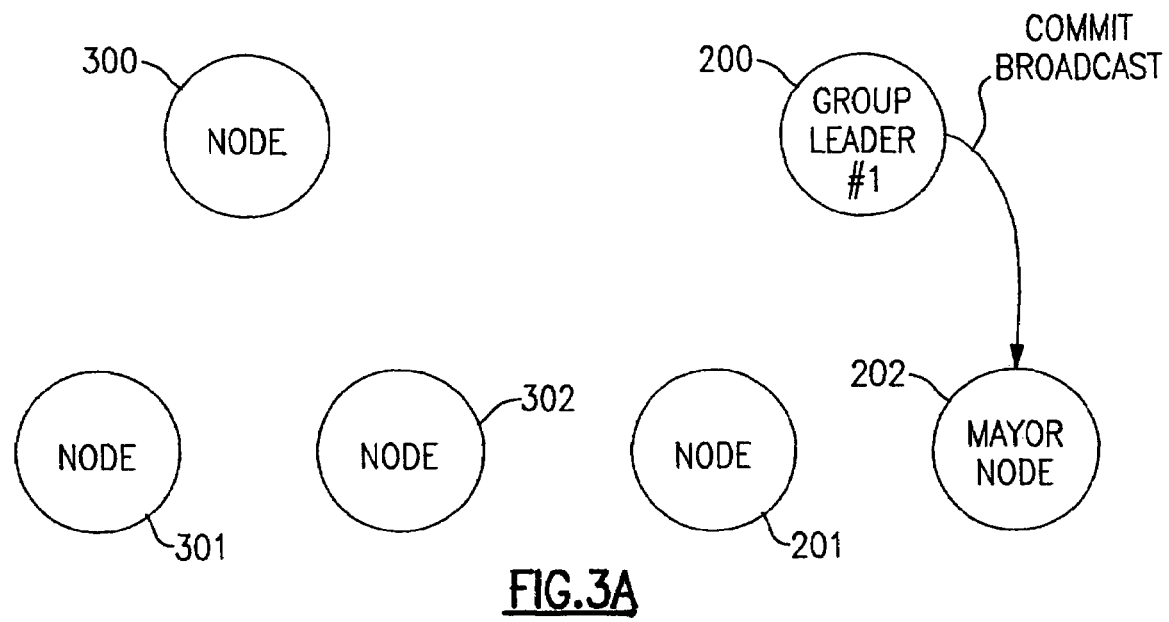
FIG. 3A illustrates the nodes that are involved in a "commit" broadcast message.
Figure 3B:
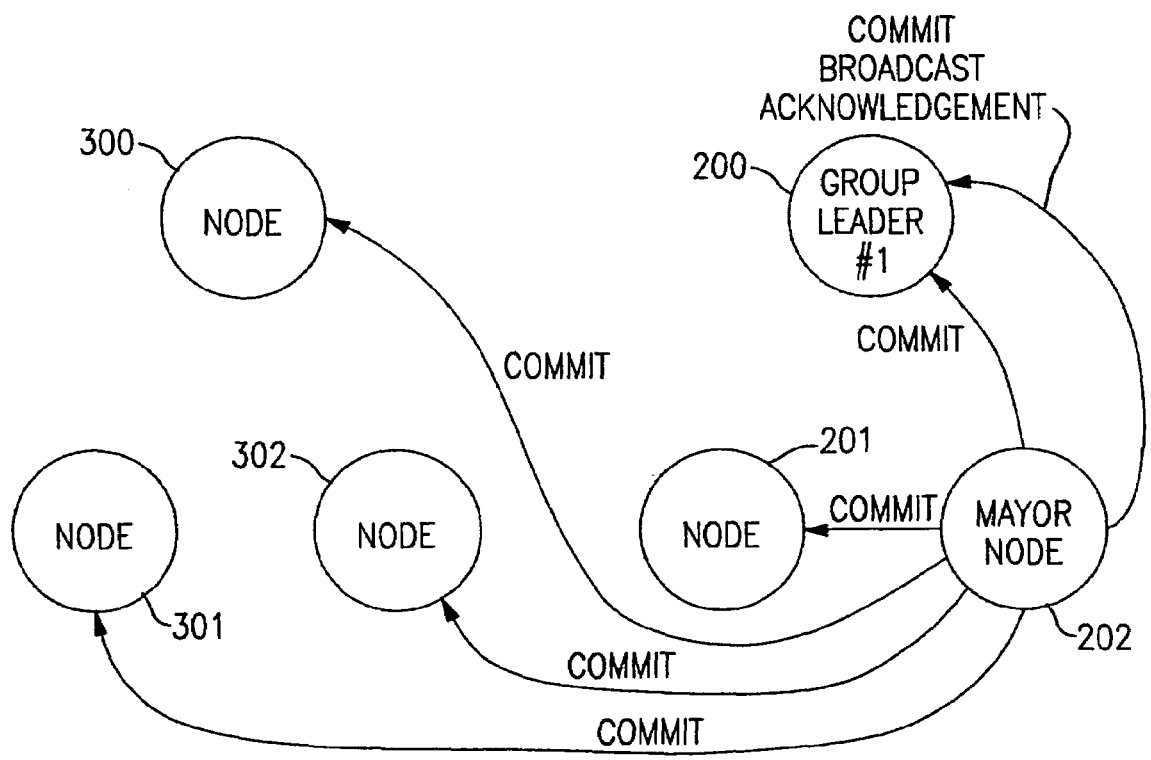
FIG. 3B is a signal flow graph similar to FIG. 3A, but more particularly illustrating the range of nodes in the transmission of a "commit" message.

FIG. 3A illustrates the use of a "commit broadcast" message transmission from Group Leader 200 to "Mayor Node" 202 for the processing of further transmissions regarding "commit" operations. The concept of a Mayor Node is that it is preferably used to off load some of the communications burden from the Group Leader. This is more particularly shown in FIG. 3B which also illustrates the transmission of a "commit broadcast acknowledgment" message back to Group Leader 200 from Mayor Node 202. FIG. 3B also illustrates the transmission protocol for the "commit" message. In particular, the use of a "mayor" node is shown as being employed as a helpful mechanism to off load work from the Group Leader, particularly communication burdens. Typically, there is one "mayor" on each subnet, and a mayor is responsible for relaying certain assigned messages from the group leader to its subnet. For some messages that need to go out to everyone, the group leader selects a Mayor Node from each subnet and sends the message point-to-point to such mayors. Each Mayor Node then sends the message broadcast or point-to-point (depending on the message type and the size of the group) to each adapter on its subnet. The group-leader-to-mayor and mayor-to-subnet messages are subject to acknowledgment and retry. If a Mayor Node fails to acknowledge a message, then the group leader selects a new mayor on the failed mayor's subnet and repeats the process. Not every message that needs to reach everyone is sent using the Mayor Node as an intermediary. For example, the prepare-to-commit (PTC) message is sent point-to-point from a "group-leader-want-to-be" to each and every potential group member. No Mayors Nodes are employed for this variety of message transmission.

Figure 4:
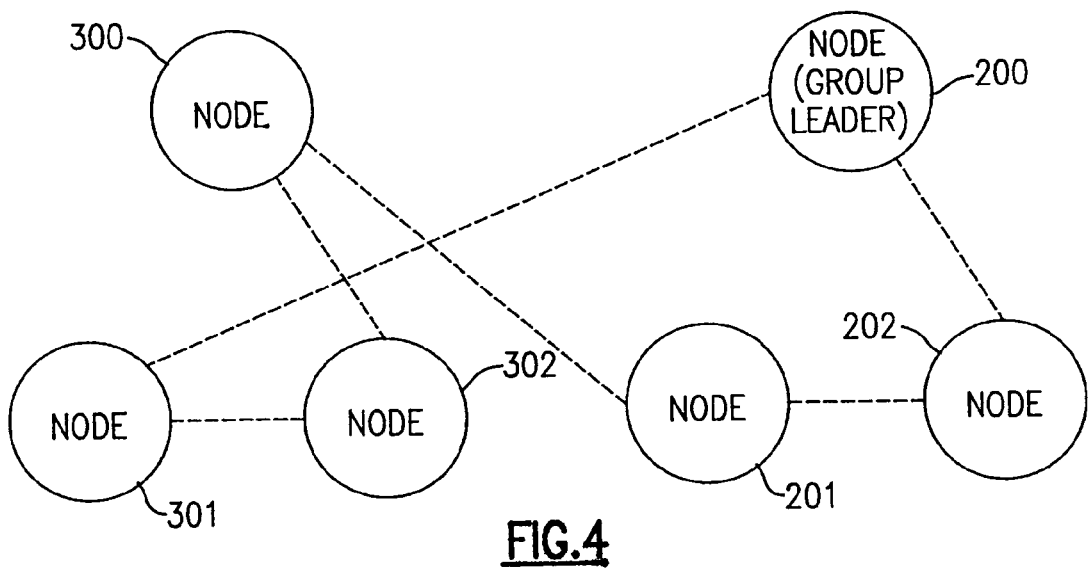
FIG. 4 is a node topology graph illustrating the ring connection which exists subsequent to the formation of a new group of nodes.

At the end of the protocol established for adding nodes, the Group Leader 200 organizes all of the nodes in the new group into a new topology. As seen in FIG. 4, this topology is preferably a ring-topology for the reasons indicated above (simplicity and scalability, in particular). In preferred embodiments of the present invention, the new Group Leader is selected to be the node with the highest IP address. However, any other convenient mechanism may also be employed for this purpose, as long as the process results in a unique selection. For example, the node that has been operative for the longest time may be selected. It is also noted that node death will also result in the formation of a new group topology. The same mechanisms that are employable with the construction of a new topology for node and/or group addition are also employable in the event of node death. However, in the case of node death, the ring-topology situation is particularly easy to structure with a new topology which, in effect, simply bypasses the defunct node.

Figure 5C:
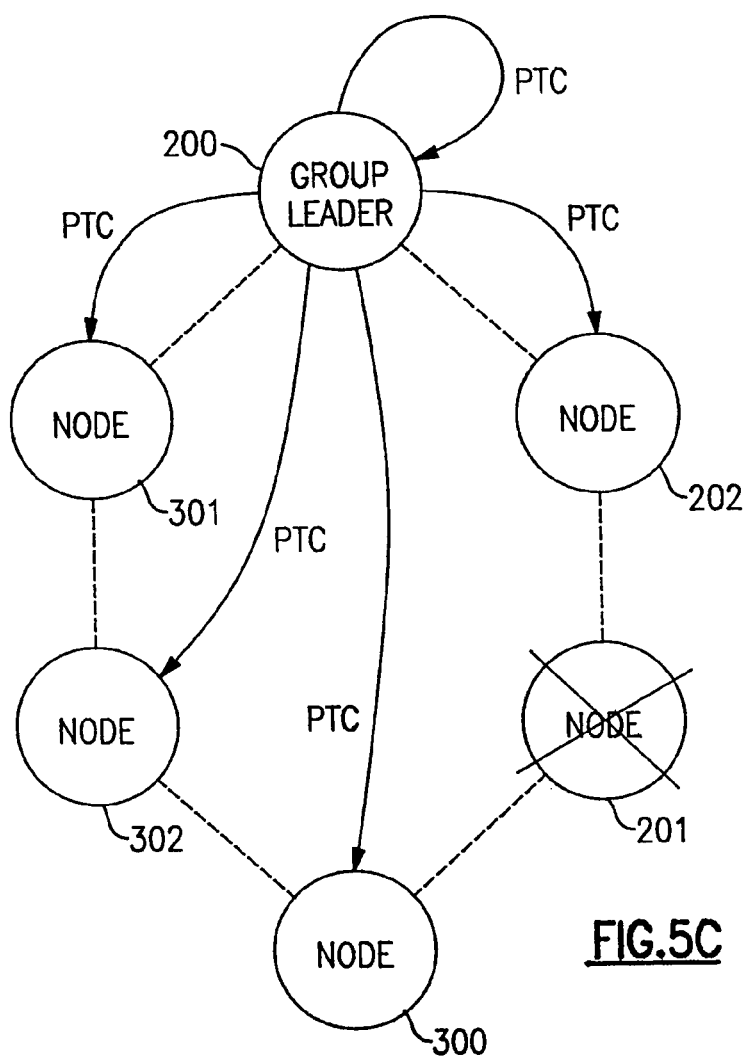
FIG. 5C is a signal flow graph illustrating similar to FIG. 5A and FIG. 5B, but more particularly illustrating the range of nodes to which "prepare to commit" messages are sent.
Figure 5B:
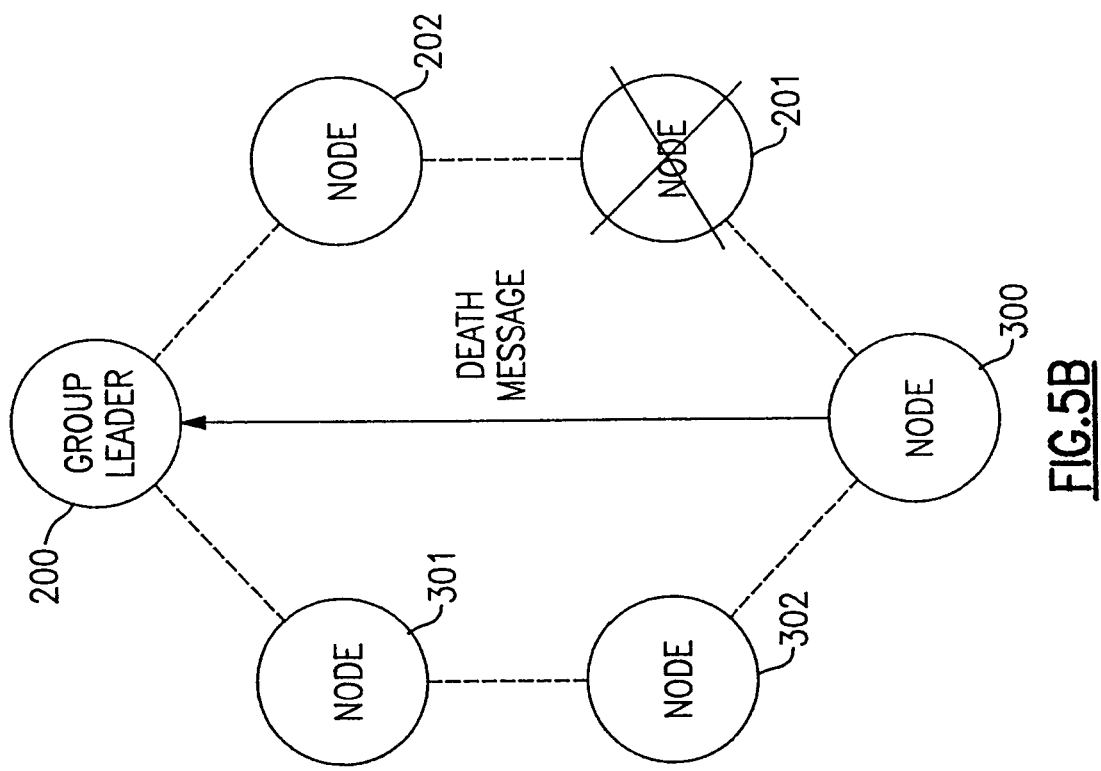
FIG. 5B is a signal flow graph illustrating similar to FIG. 5A, but more particularly illustrating "death" message transmission in the event of a node death.
Figure 5A:
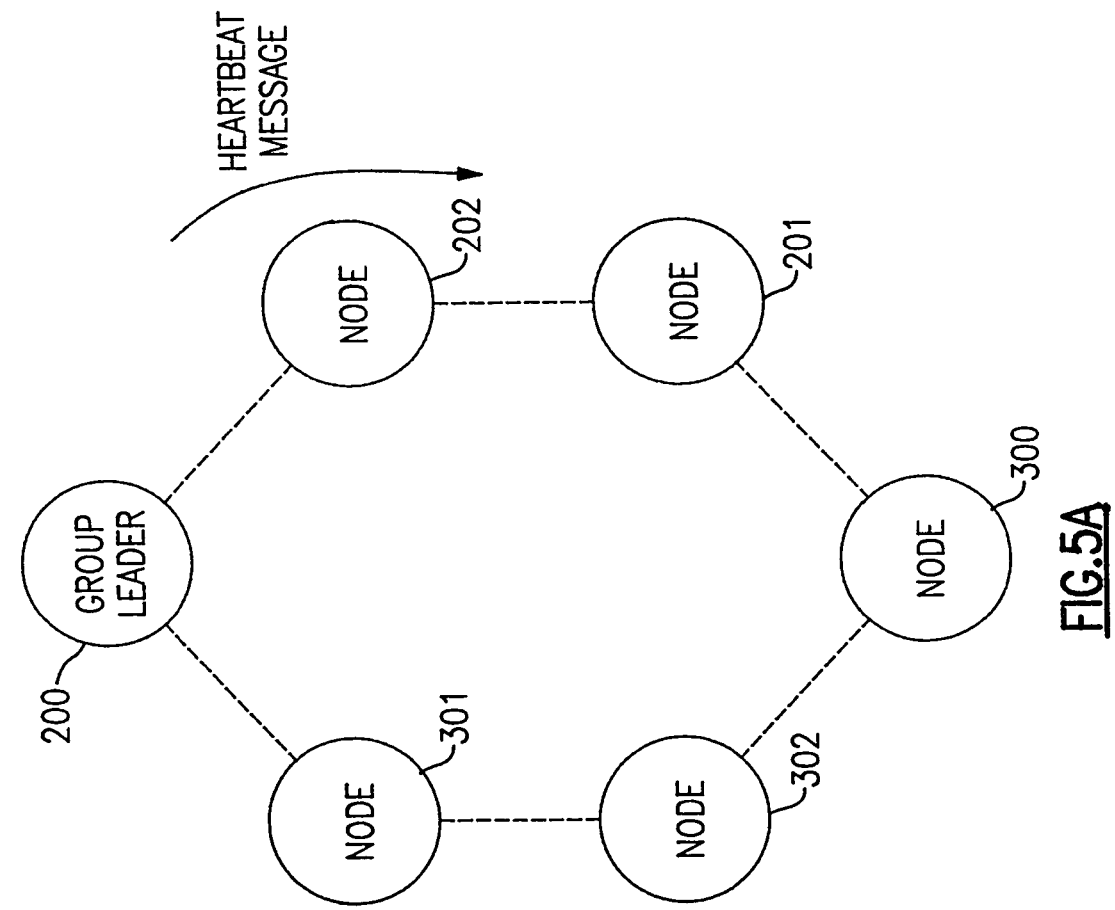
FIG. 5A is a signal flow graph illustrating the direction of flow of heart beat messages in a node group.

One of the underlying operations that the present invention employs is the heart beat mechanism described above. This is also illustrated more pictorially in FIGS. 5A, 5B, and 5C. FIG. 5A illustrates the passage of the heart beat message around a ring-topology group. FIG. 5B illustrates the occurrence of node or adapter failure at node 201. Since the heart beat message is periodic and can be expected at certain times, its presence at node 300 is missed. When this occurs, a node "death message" is sent from node 300 to Group Leader 200. Group Leader 200 then responds by attempting to form a new group without deceased node 201. To do so, a "prepare to commit" (PTC) message is sent to all of the remaining nodes in the former group, including, in effect, a PTC message to node 200, the Group Leader. New group formation then proceeds in the manner described above.

Figure 6:
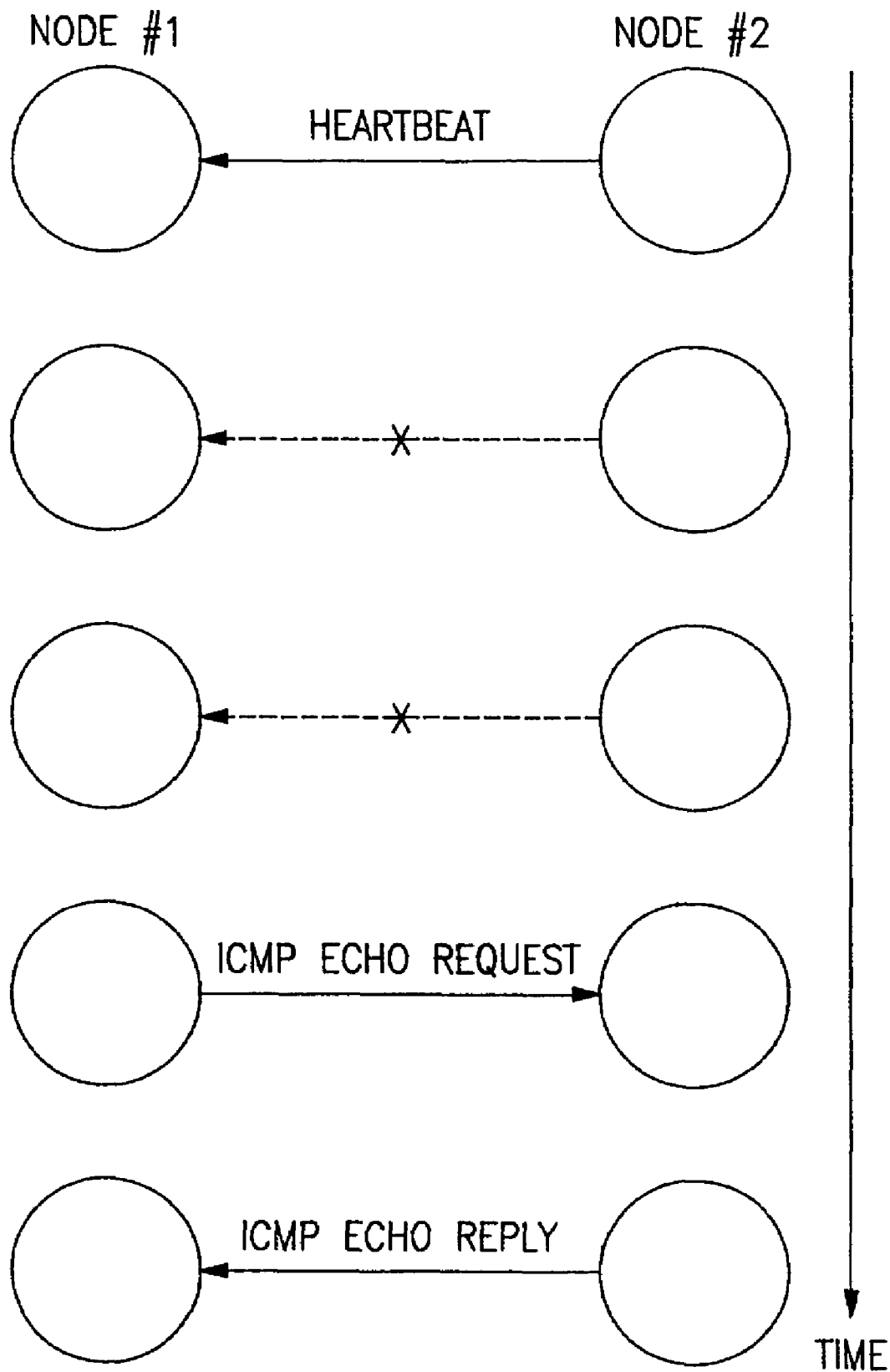
FIG. 6 is a timeline diagram illustrating the concept that several heart beat messages are missed before lower level and/or higher priority echo request messages are sent.

FIG. 6 illustrates pictorially the initial receipt of a heart beat message at Node #1 from Node #2. If a predetermined number of such messages are not received, an ICMP echo request message is sent from Node #1 to Node #2. Such echo request messages are directed to ports and/or software for which priority handling is available. This priority can be provided since such messages are typically designed to be very simple and to not require any significant amount of processor time or resources on the receiving end (or even on the transmitting end). Such messages are simple and are replied to quickly whenever it is possible. Thus, even if certain expected messages are held up due to events such as memory constraint problems, the ICMP echo request and the ICMP echo reply are handled quickly, thus preventing the premature and inaccurate reporting of a node death, when in fact, the node is only suffering a "short illness."

Figure 7:
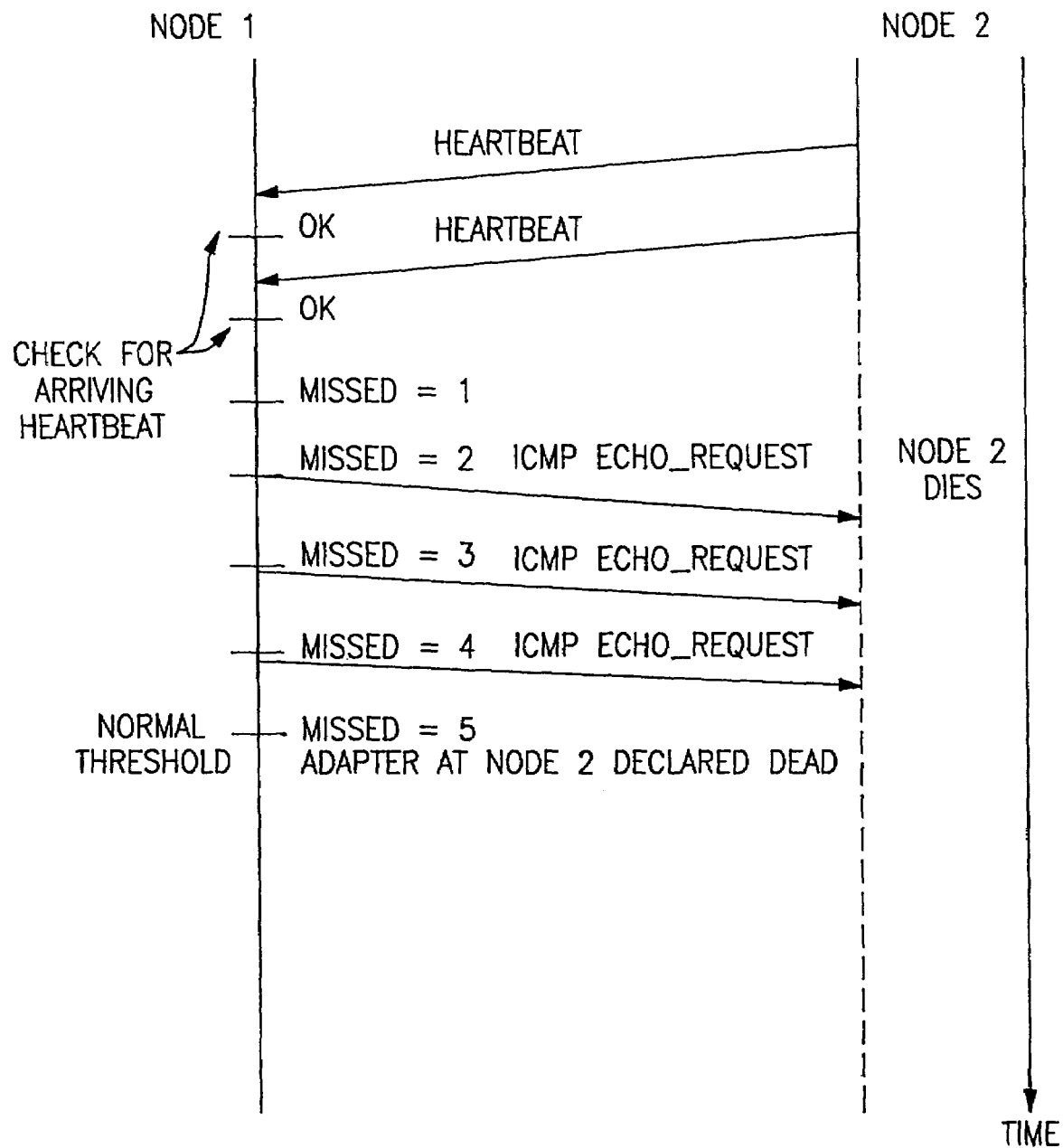
FIG. 7 is an event timeline diagram which particularly illustrates message transmission in the situation in which the Topology Services daemon on Node 2 is temporarily blocked.

FIG. 7 illustrates the exchange of heart beats and messages in the event that there is not just "short term node illness," but a genuine node or adapter failure. In particular, it is seen that, in general, the method tolerates a certain number of missed heart beat messages. When a certain number of heart beat messages have been missed (preferably 2), several attempts are made to transmit an ICMP echo request message. If after a certain number of such attempts (preferably 3), Node #2 is declared dead.

Figure 8:
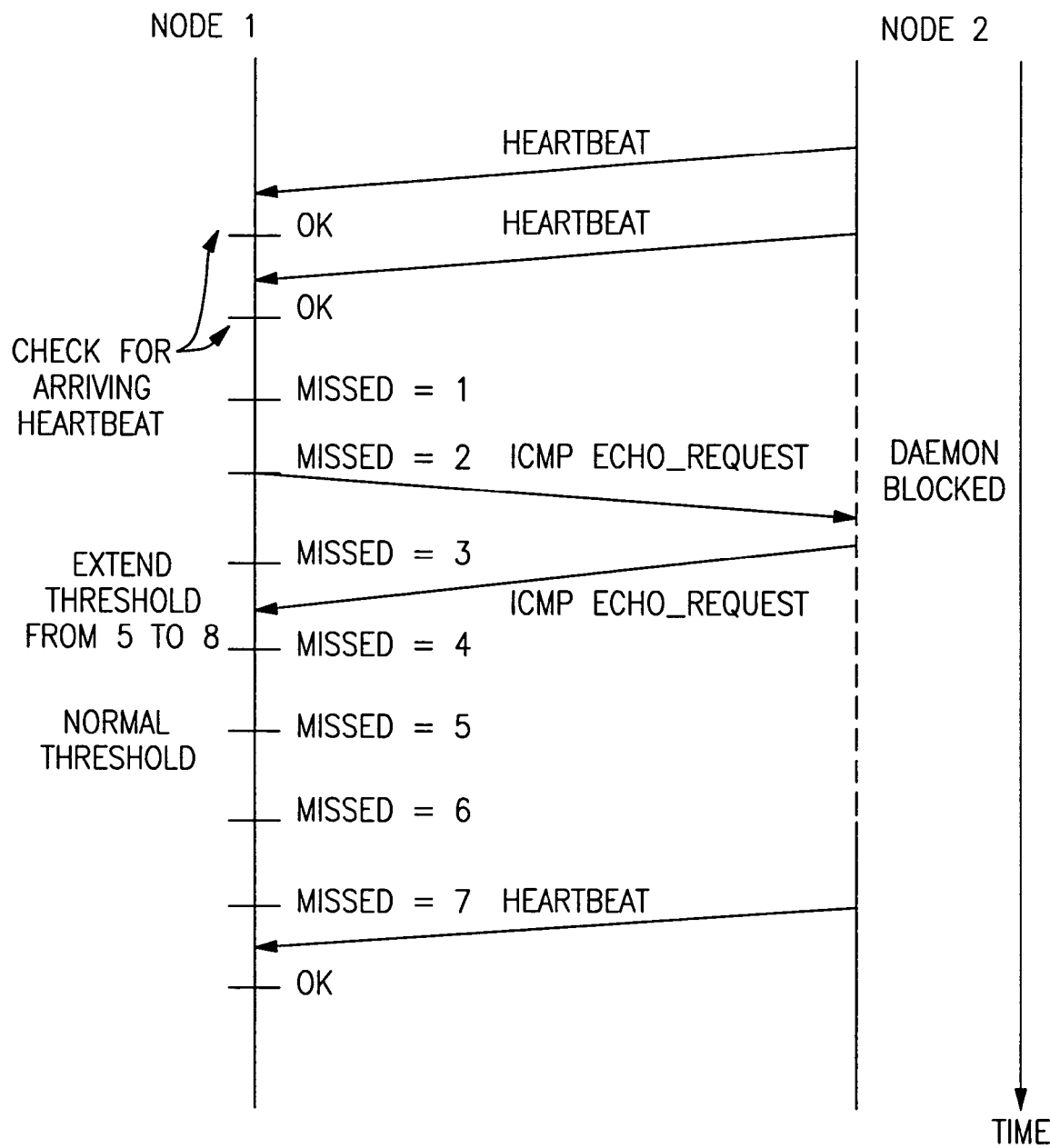
FIG. 8 is an event timeline illustrating message transmission in the situation in which Node 2 dies.

FIG. 8 is similar to FIG. 7, but it illustrates the advantages of the present invention that occur when a node is not really "dead," but only suffering from a short-term problem. In such cases, the questionable node is sent an ICMP echo request message, and a response to this message is sent to the transmitting node (Node #1 here). This permits the establishment of a grace period for the re-establishment of a heart beat message. In the example shown, the threshold is extended from 5 to 8 such heart beats. Here, the short term illness is caused by the blocking of the daemon on Node #2, probably caused by memory constraint problems. However, there could be other causes as well for which the present method provides performance and stability benefits.

FIG. 9 illustrates the extension of the above method from heart beat messages to the transmission of "prepare to commit" (PTC) messages. In this example, it is assumed that there are only three nodes participating (for graphical simplicity): Node #1, Node #2 and Node #3. The sequence begins with the transmission of a "prepare to commit" message from Node #1 (to all of the other nodes) which also starts a "PTC retry timer" as a mechanism for gauging when responses to the PTC message are expected. The lack of an acknowledgment message from Node #3 (due to a blocked daemon as opposed to a dead node or adapter) triggers the transmission to Node # 3 of a second PTC message. The lack of response to the PTC retry #1 message triggers the transmission of the lower level ICMP echo-request to Node #3. Since the lack of response to the PTC messages is due only to temporary daemon blockage, Node #3 is still able to respond to the echo request message with an ICMP echo-reply message sent to Node #1. The receipt of the ICMP echo-reply message at Node #1 means that Node #3 is only temporarily blocked and not "dead." This permits the time for the acknowledgment of the PTC message to be extended in spite of the event of daemon blockage at Node #3. In this example, the PTC message is sent to Node #2 and Node #3. Node #2 responds with a PTC_ACK (acknowledgment) message. The lack of response from Node #3 to the original PTC message triggers the transmission of an ICMP echo-request message to Node #3. As described above, this message is one that is simpler, more direct, and is one that is much more likely to be responded to in the event that the node and its adapter unit(s) are alive but otherwise busy. While this message exchange is taking place primarily between Node #1 and Node #3, in the meantime Node #2 has acknowledged the original PTC message and is waiting for a "commit" message from Node #1. If Node #2 has not received the "commit" message and the time for its expected arrival has elapsed, Node #2 also assumes there is a problem and preferably also sends an ICMP echo-request message to Node #1. In the illustration shown in FIG. 9, it is seen that a response to the ICMP echo-request message sent from Node #2 (namely, an ICMP echo-reply message) is received at Node #1, thus causing the normal deadline for receiving a commit message to be extended in substantially the same manner as described above, with the similar default preferences for recognition and extension. This assures that all Nodes ultimately receive and respond to a commit message.

From the above, it should be appreciated that all of the stated objects are achieved in one or more embodiments of the present invention. It should also be appreciated that there is provided a mechanism for detecting remote adapter and/or node failure which is based on relatively low priority messaging for most of its functioning, but which is capable of reverting to a lower level, higher priority messaging system using echo request messages in conjunction with a grace period as an alternate mechanism. More particularly, it is seen that the present invention provides a mechanism for dealing with blocked daemons in the execution of a distributed protocol. It is furthermore seen that the present invention also does not require introducing new messages into the protocol.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for adding new members to a group of nodes in a connected data processing network, said method comprising the steps of:
    periodically sending, from a first group leader node a proclaim message to select nodes in the network configuration but which are not currently part of the group;
    responding to said proclaim message from said first group leader node with a join message from a group leader of an other group having said lower network address, said join message including a membership list for any joining groups;
    transmitting a prepare-to-commit message to said nodes within any of said joining groups;
    receiving, at said first group leader node, an acknowledgment of said prepare to commit message, from at least one node;
    sending a commit message with updated membership list to all nodes on the updated list;
    following said periodic sending, determining that a specified number of said prepare-to-commit message transmissions have not been received from a potentially failed node; and
    sending an echo-request message to said potentially failed node, said echo request message being directed to an other program running on said potentially failed node that is less susceptible than said prepare-to-commit message to being delayed.

2. The method of claim 1 in which said other program is part of an operating system kernel running on said potentially failed node.

3. The method of claim 1 in which said potentially failed node is prevented from responding within said first specified time period due to memory allocation constraints within said potentially failed node.

4. The method of claim 3 in which said potentially failed node is prevented from responding within said first specified time period due to program priority constraints within said potentially failed node.

5. The method of claim 1 further including the step of reporting that said potentially failed node is dead when there is no response to said echo request message.

6. The method of claim 1 in which said proclaim message is transmitted three times without a response before said echo request message is sent.

7. The method of claim 6 further including a step of reporting that said potentially failed node is dead when there is no response to said prepare-to-commit message at the end of said grace period.

8. The method of claim 1 further including the step of establishing a grace period for a response to said prepare-to-commit message when a response to said echo request message is received.

* * * * *